April 14, 1959  D. W. MAGNUSON ET AL  2,882,442
METHOD FOR STABILIZING KLYSTRONS
Filed March 16, 1955  2 Sheets-Sheet 1

INVENTOR.
DALE W. MAGNUSON
AND
DEFOREST F. SMITH
BY
Roland G. Anderson
ATTORNEY

April 14, 1959     D. W. MAGNUSON ET AL     2,882,442
METHOD FOR STABILIZING KLYSTRONS
Filed March 16, 1955     2 Sheets-Sheet 2

INVENTOR.
DALE W. MAGNUSON
AND
DEFOREST F. SMITH
BY Roland A. Anderson
ATTORNEY

United States Patent Office 2,882,442
Patented Apr. 14, 1959

2,882,442

METHOD FOR STABILIZING KLYSTRONS

Dale W. Magnuson, Knoxville, and De Forest F. Smith, Kingston, Tenn., assignors to the United States of America as represented by the United States Atomic Energy Commission Application March 16, 1955, Serial No. 494,826

7 Claims. (Cl. 315—5.18)

This invention relates to high frequency oscillators for the generation of microwaves, and more particularly to a method and system for stabilizing frequency modulated klystron oscillators of the reflex type.

Heretofore in the prior art, it has been the practice in the measurement of the composition of a gas, for instance, to measure its density as a function of dielectric-constant, since density is proportional to dielectric-constant. When the gas to be analyzed is fed to a resonant cavity, the signal produced is proportional to frequency shift, and this in turn is proportional to changes in dielectric-constant of the gas. By comparing the signals produced under these circumstances with those from a standard evacuated cavity which oscillates at a fixed frequency and serves as a standard, it is possible to accurately determine the composition of the gas under examination. However, the tendency of the klystron oscillator to drift from the desired frequency in response to thermal changes and for other causes, results in altering the signals produced and this introduces inaccuracies in the measurement of gas composition.

Arrangements have been devised for controlling the stability of high frequency tuned oscillators such as the klystron for fixed frequency operation. See Pound, 17 Review of Scientific Instruments, page 491. However, such arrangements were complicated and not suitable for stabilizing klystron oscillators in frequency modulated systems. In frequency modulated systems stabilization was generally undertaken (a) by manual tuning of the cavity resonator, or (b) by manual adjustment of the oscillator reflector voltage. These were only partially successful in compensating for drift, and required the continued attention of the operator.

Applicants with a knowledge of these problems of the prior art have for an object of their invention the provision of an arrangement for stabilizing a klystron oscillator against drifts resulting from thermal changes occurring therein.

Applicants have as another object of their invention the provision of a stabilizing circuit for a high frequency klystron oscillator of the reflex type which overcomes the necessity for constant supervision and adjustment during operation.

Applicants have as a further object of their invention the provision of a system for stabilizing a high frequency klystron oscillator of the reflex type for long periods of time without the necessity for manually tuning or adjusting it.

Applicants have as a still further object of their invention the provision of a circuit for stabilizing klystron oscillators against frequency drift resulting from fluctuations in supply voltage.

Applicants have as a still further object of their invention the provision of a circuit for stabilizing high frequency klystron oscillators of the reflex type in a system wherein advantage is taken of the fact that a change in oscillator frequency will alter the normal phase displacement between the cavity and its modulator, creating an "error voltage" which may be utilized to regulate the frequency of the oscillator and stabilize it.

Other objects and advantages of our invention will appear in the following specification and accompanying drawings, and the novel features thereof will be particularly pointed out in the annexed claims.

In the drawings, Figure 1 is a block diagram of a simplified circuit for stabilizing a high frequency oscillator.

Figure 1:
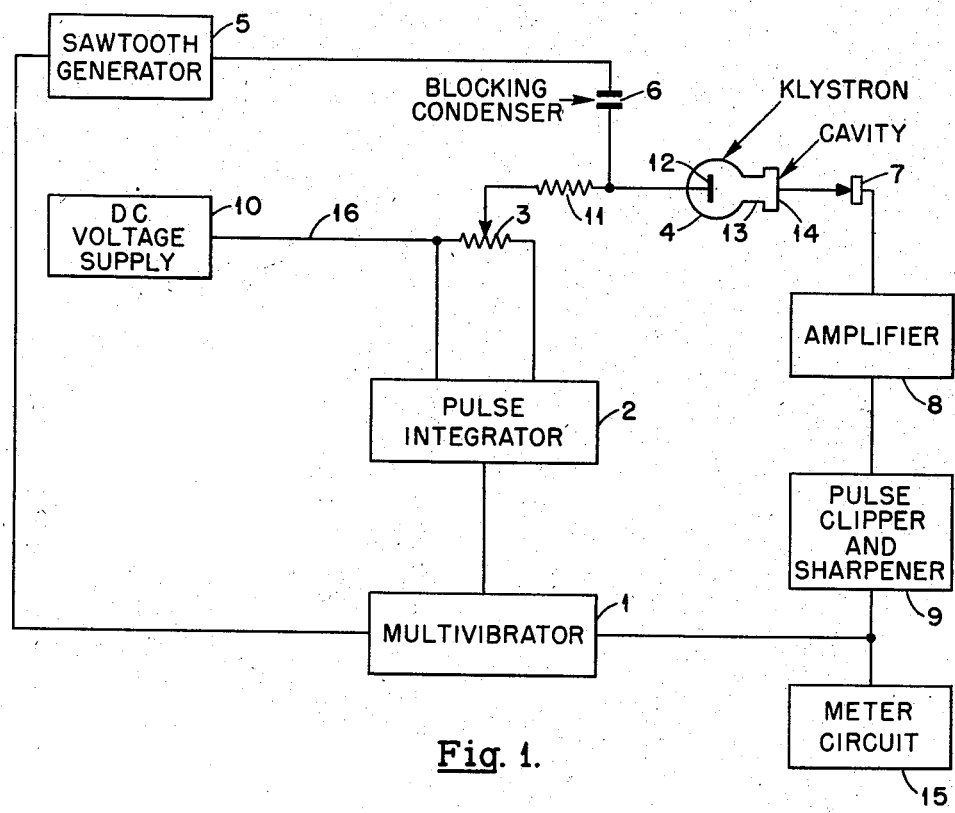

Referring to the drawings in detail, 4 designates a klystron having its reflector electrode 12 coupled through a fixed resistor 11 to a regulated direct current voltage supply source 10 to provide a fixed bias voltage for the electrode 12 which is negative with respect to its cathode. A suitable saw-tooth generator or sweep circuit 5 is coupled to the reflector electrode 12 of the klystron 4 through a coupling condenser 6 which serves to block out the direct current potential from source 10, and prevent it from reaching the saw-tooth generator. The klystron 4 is coupled through appropriate means such as a wave guide 13 to a resonant cavity 14. The resonance pulse output obtained from the klystron 4 and its associated cavity resonator 14 is coupled into and passed by crystal 7, or other suitable detector. The output of crystal 7 is then fed to an amplifier 8 where it is amplified and passed on to the pulse clipper and sharpener 9 where it is clipped and sharpened before being fed to the meter or record circuit 15.

Figure 2:
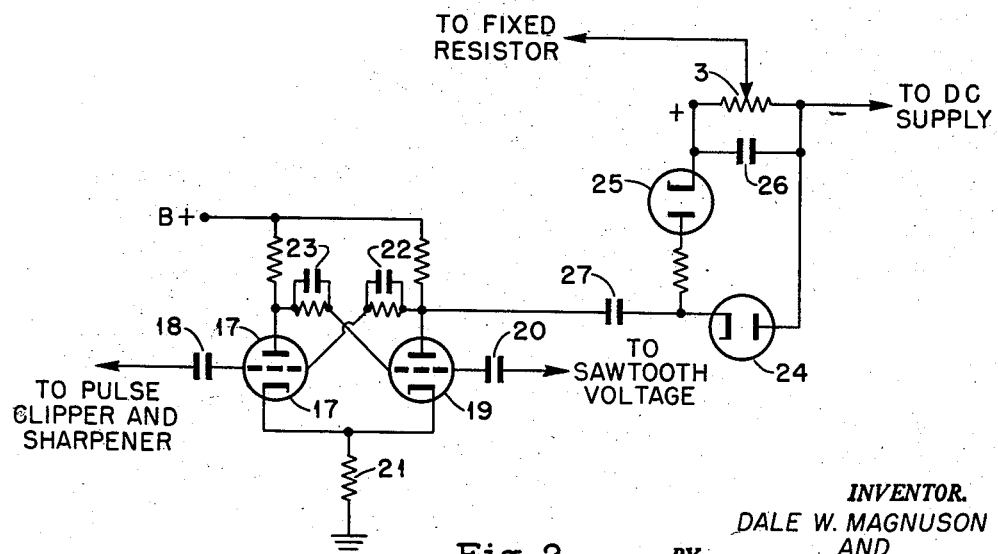
Figure 2 is a schematic of a preferred form of multivibrator and pulse integrating circuit for use in our improved stabilizing system.

Applicants' improved stabilizing circuit comprises a multivibrator 1 and integrator 2. The output of the pulse integrator 2 is coupled into the D.C. voltage supply 10 for the klystron 4 through the potentiometer 3, of the integrating circuit. The potentiometer is interposed in the supply lead of source 10 before reaching the resistor 11. This is done by connecting the lead 16 to an extremity of the potentiometer and then connecting the movable contact thereof to the resistor 11. The input for the multivibrator control circuit 1 is obtained by connecting it to the output of the pulse clipper and sharpener 9, and to the saw-tooth generator or sweep circuit 5. As shown in Figure 2, the former connection is accomplished by coupling the control grid of one of the multivibrator tubes 17 through a coupling condenser 18 to the output of pulse clipper and sharpener 9. The latter connection is accomplished by coupling the control grid of tube 19 through condenser 20 to the saw-tooth generator or sweep circuit 5 in such a manner that it will respond to a fraction of the saw-tooth modulated voltage from that generator. The multivibrator is otherwise of conventional form having its cathodes grounded through a common resistor 21. The usual plate to grid condenser-resistor networks 22, 23 are likewise provided. The output of the multivibrator is coupled through capacitor 27 to the pulse integrating circuit. This latter circuit comprises a pair of diodes 24, 25 and a storage condenser 26 shunted by potentiometer 3. Positive pulses from the multivibrator pass through diode 25 and are stored in condenser 26. They leak off of the condenser 26 through the potentiometer 3, and the flow of current through the resistance of that potentiometer is a measure of the charge. Current flow from the opposite side of the condenser 26 is blocked by diode 24.

Figure 3:
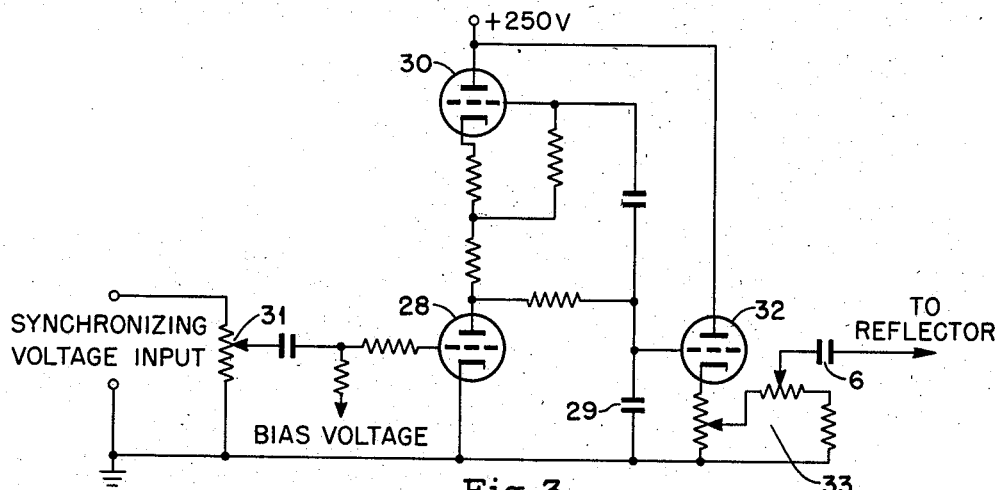
Figure 3 is a schematic of a suitable type of saw-tooth generator or linear sweep circuit for use in this system.

The saw-tooth generator may be of any suitable conventional type, but the one shown in Figure 3 is preferred. It includes a gas tube 28, preferably a thyratron, and a storage condenser 29. The storage condenser is insured of a constant charging current by a feed back loop which includes a cathode follower 30. This arrangement provides a linear sweep. The gas tube or thyratron 28 is coupled to the power supply through a network 31. By firing the thyratron with a wave form obtained from the power supply, the repetition rate of this voltage can be maintained at 120 cycles per second. The arrangement operates as a relaxation oscillator and the saw-tooth wave is coupled through cathode follower 32, resistor network 33 and coupling condenser 6 to the reflector electrode 12 of the klystron 4.

Figure 4:
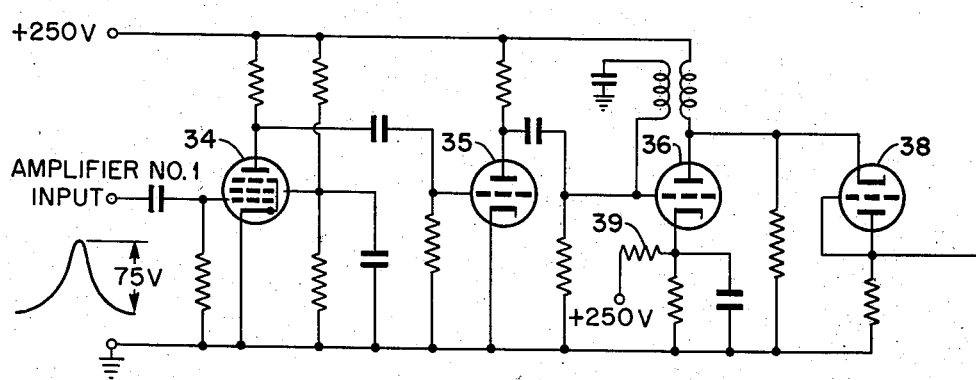
Figure 4 is a schematic of a suitable pulse clipper and sharpener circuit for use in our improved system.
Figure 4:
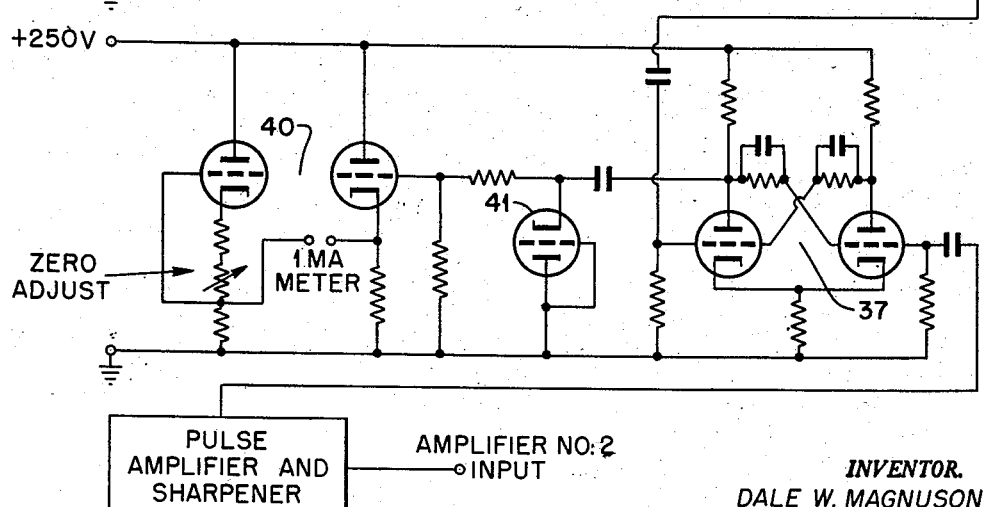

The amplifier 8 may be of any suitable conventional type, such as a standard resistance-capacitance coupled amplifier. The pulse clipper and sharpener 9 may also be of any suitable type, but a preferred form is shown in Figure 4. The resonance pulse is fed from amplifier 8 to the tube 34 where it is clipped, preferably at approximately 90% of its peak amplitude, but this may be adjusted, as desired, by changing the potential of the screen of the tube. After clipping, the pulse is passed and amplified by this tube. The amplified pulse is then fed to tube 35 where it is further amplified. The output of tube 35 is coupled to a blocking oscillator 36 and serves to trigger it, producing a very sharp negative wave form which is suitable for firing the "flop over" circuit 37. The diode 38 is interposed between oscillator 36 and the "flop over" circuit 37 and serves to decouple the "flop over" circuit 37 from the positive overshoot of oscillator 36. The trigger level of oscillator 36 is controlled by the cathode bias which is coupled to the oscillator through resistor 39.

The "flop over" circuit 37 may be of any appropriate type, but a preferred form is the Eccles-Jordan trigger circuit described in Elmore and Sands work on "Electronics," vol. VI, National Nuclear Energy Series, published by McGraw and Hill Book Company, Inc., New York, N. Y., in 1949, pages 96–99. It has the characteristic that a negative pulse on the grid of one tube will stop conduction in that tube and start conduction in the other tube, hence if pulses are applied alternately to the grids, a rectangular wave form is generated at the plate of either tube with constant amplitude. The output of this circuit is a rectangular wave form with a constant amplitude and a variable width.

The rectangular pulse from the "flop over" circuit is applied to duo-triode 40, a differential amplifier which drives either a current meter or a recorder (not shown). The grid of the first section of tube 40 is clamped to ground by a direct current restorer 41.

One use of this system is in the measurement of the density of gases, although other uses and applications are possible. In operation, the klystron 4 is modulated with the saw-tooth voltage applied to its reflector 12 by the saw-tooth generator or sweep circuit 5. The microwave radio frequency power from the frequency modulated oscillator 4 may be applied to the two resonant cavities, although, for convenience, only one is shown in Figure 1. One cavity (not shown) simply serves as a frequency standard or reference and an appropriate circuit for associating it with other cavities may be found in 21 Review of Scientific Instruments, page 169. The other cavity 14 feeds signals to crystal 7 and are detected by it. The detected signals are then amplified in amplifier 8 and clipped and sharpened in pulse clipper and sharpener circuit 9 so that they may serve to drive a recorder or meter circuit 15.

Since the frequency drifts will serve to introduce errors in counting and cause false operation of the system, stabilization is necessary and is based upon the fact that in such circuits any change in the klystron oscillator frequency changes the normal phase displacement between the cavity resonance peak and the aforementioned saw-tooth modulating voltage. In this arrangement, additional circuit elements are provided for feeding back into the reflector biasing circuit an "error voltage" whose magnitude is proportional to the phase displacement between the resonance peak and the modulating voltage. This error voltage is connected into the biasing circuit so as to (1) decrease the reflector bias when the oscillator frequency tends to increase, and (2) increase the reflector bias when the oscillator frequency tends to decrease. This provides effective automatic regulation of the oscillator frequency.

In the control circuit of Figure 2, the various circuit values are chosen so that the multivibrator is energized each time the saw-tooth voltage decays, and de-energized each time the resonance pulse approaches maximum value. Consequently, a rectangular wave output from the multivibrator can be obtained whose width varies directly with the phase displacement of the resonance peak and the saw-tooth voltage. This output is fed into any suitable pulse-integrating circuit 2, whose output provides the "error voltage" and is impressed across a resistor 3 connected in the biasing line leading to the reflector electrode. With this arrangement, the reflector bias is adjusted automatically to offset incipient variations in the oscillator frequency.

The stability of the over-all circuit was determined by (1) centering the resonance pulse trace on a standard oscilloscope whose sweep was synchronized with the klystron modulating voltage, and (2) observing the change in the position of the resonance pulse when the reflector biasing voltage was changed by manual adjustment of the output from the D.C. supply. Under these conditions, it was noted that when the stabilization circuit was not employed a one-volt change in the reflector bias moved the resonance peak from one-quarter to three-quarters of the sweep. When the stabilizing circuit was employed, however, a change of 65 volts in the biasing voltage was required to produce a like displacement of the trace.

While applicants have shown a preferred form of their stabilizing circuit in Figures 1 and 2, it is apparent that this circuit may take many different forms. Likewise, applicants, for convenience in explaining one application of their stabilization circuit, have pointed out that it could be used in a system where the composition of a gas is to be determined, although, it will be apparent that the stabilizing circuit may be used in almost any arrangement where the stabilization of a klystron is desired.

Having thus described our invention, we claim:

1. A system for stabilizing high frequency oscillators of the reflex type comprising a cavity oscillator having a reflector electrode, and an external high Q cavity resonator, a direct current voltage supply coupled to said electrode to apply a negative bias thereto, a saw-tooth generator coupled to the voltage supply and the reflector electrode for modulating the oscillator to sweep a band of frequencies, means for coupling the cavity resonator to an output circuit including an indicator, and a control circuit fed by the output circuit and the generator coupled to the reflector electrode to provide a resultant signal for adjusting the magnitude of its bias in response to drift in oscillator frequency.

2. A system for stabilizing high frequency oscillators of the reflex type comprising a cavity oscillator having a reflector electrode and an external high Q cavity resonator, a source of direct current voltage coupled to said electrode for applying a negative bias thereto, a saw-tooth generator coupled to the voltage supply and the reflector electrode for modulating the oscillator, means for coupling the cavity resonator to an output circuit including a pulse clipper and sharpener, and a control circuit fed by the pulse clipper and sharpener and the generator and coupled to the reflector electrode to feed back a signal corresponding to the phase displacement between the peak of the resonator and the modulating voltage of the generator for adjusting its bias in response to drift in oscillator frequency to restore stability.

3. A system for stabilizing a high frequency oscillator of the reflex type comprising a cavity oscillator having a reflector electrode and a high Q cavity resonator, a source of direct current voltage connected to apply a negative potential to the reflector electrode, a saw-tooth generator capacitatively coupled to the reflector electrode to modulate the oscillator, an output circuit fed by the cavity resonator, and a pulse integrating control circuit including a multivibrator fed by the output circuit and said generator, said multivibrator being coupled to the reflector electrode for applying a corrective voltage signal corresponding to the phase relation of signals from the resonator and generator to adjust its potential in response to changes in frequency of the output circuit.

4. A system for stabilizing high frequency oscillators of the reflex type comprising a cavity oscillator having a reflector electrode and a high Q cavity resonator, a source of direct voltage connected to the reflector electrode, a saw-tooth generator capacitatively coupled to the reflector electrode to modulate the oscillator, an output circuit fed by the cavity resonator, and a control circuit coupled to and fed by the output circuit and the saw-tooth generator including a multivibrator and a pulse integrator fed by the multivibrator coupled to the reflector electrode for applying a corrective voltage signal thereto corresponding to the phase displacement between the peak of the resonator and the modulating voltage of the generator in response to changes in frequency of the oscillator to alter the bias of said electrode.

5. A system for stabilizing high frequency oscillators of the reflex type comprising a cavity oscillator having a reflector electrode and an external high Q cavity resonator, a source of direct current voltage connected to the reflector electrode, a saw-tooth genereator coupled to the source and the reflector electrode to provide a saw-tooth wave to modulate the oscillator, an output circuit fed by the cavity resonator, a control circuit including a multivibrator and a pulse integrator having its input coupled to the output of the multivibrator, said multivibrator having one input fed by the output circuit and the other fed by the saw-tooth generator, and means for coupling the control circuit to the reflector electrode to feed back signal corresponding to the phase displacement between the resonant peak of the resonator and the modulating voltage of the generator and alter its bias in response to frequency drifts of said oscillator.

6. A system for stabilizing high frequency oscillators of the reflex type comprising a cavity oscillator having a reflector electrode and an external high Q cavity resonator, a source of direct current voltage connected to the reflector electrode, a saw-tooth generator coupled to the source and the reflector electrode to provide a saw-tooth wave to modulate the oscillator, an output circuit including a pulse clipper and sharpener fed by the cavity resonator, a control circuit including a multivibrator and a pulse integrator fed by said multivibrator, said multivibrator having one input fed by the pulse clipper and sharpener and the other fed by the saw-tooth generator, and means for coupling the control circuit to the reflector electrode to feed back a signal whose magnitude is proportional to the phase displacement between the resonant peak of the cavity resonator and the modulating voltage of the generator and alter its bias in response to frequency drifts of said oscillator.

7. A system for stabilizing high frequency oscillators the reflex type comprising a cavity oscillator having a reflector electrode and a high Q cavity resonator, a source of direct current voltage connected to the reflector electrode, a saw-tooth generator coupled to the source and the reflector electrode to provide a saw-tooth wave to modulate the oscillator, an output circuit including a pulse clipper and sharpener fed by the cavity resonator, a control circuit including a multivibrator and a pulse integrator having its input coupled to the output of the multivibrator, said multivibrator having one input fed by the pulse clipper and sharpener and the other fed by the saw-tooth generator, said integrator having its output coupled to the output of said source and a resistor interposed between the source and said electrode for coupling the control circuit thereto to feed back a signal whose magnitude is proportional to the phase displacement between the resonant peak of the cavity resonator and the signal from the generator and alter its bias in response to frequency drifts of said oscillator.

References Cited in the file of this patent

UNITED STATES PATENTS

| | | |
|---|---|---|
| 2,454,265 | Jaynes | Nov. 16, 1948 |
| 2,475,074 | Bradley et al. | July 5, 1949 |
| 2,555,131 | Hershberger | May 29, 1951 |
| 2,595,662 | Houghton | May 6, 1952 |
| 2,699,503 | Lyons et al. | Jan. 11, 1955 |
| 2,754,420 | Ratcliff | July 10, 1956 |